March 2, 1937. C. L. LUDWIG 2,072,760
MEASURING AND DISPENSING APPLIANCE
Filed Sept. 14, 1936 4 Sheets-Sheet 1
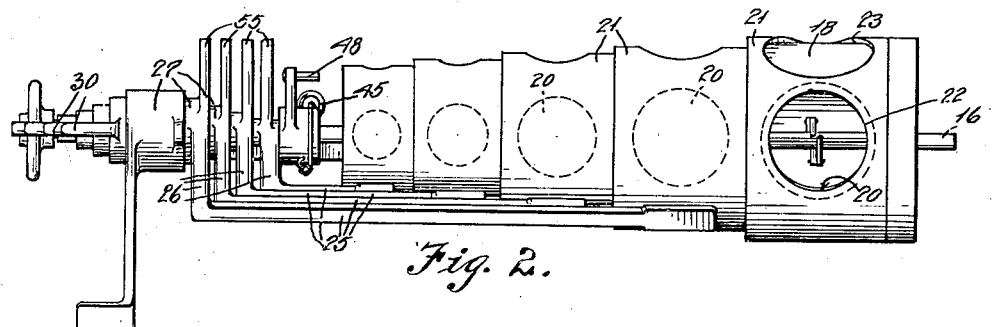
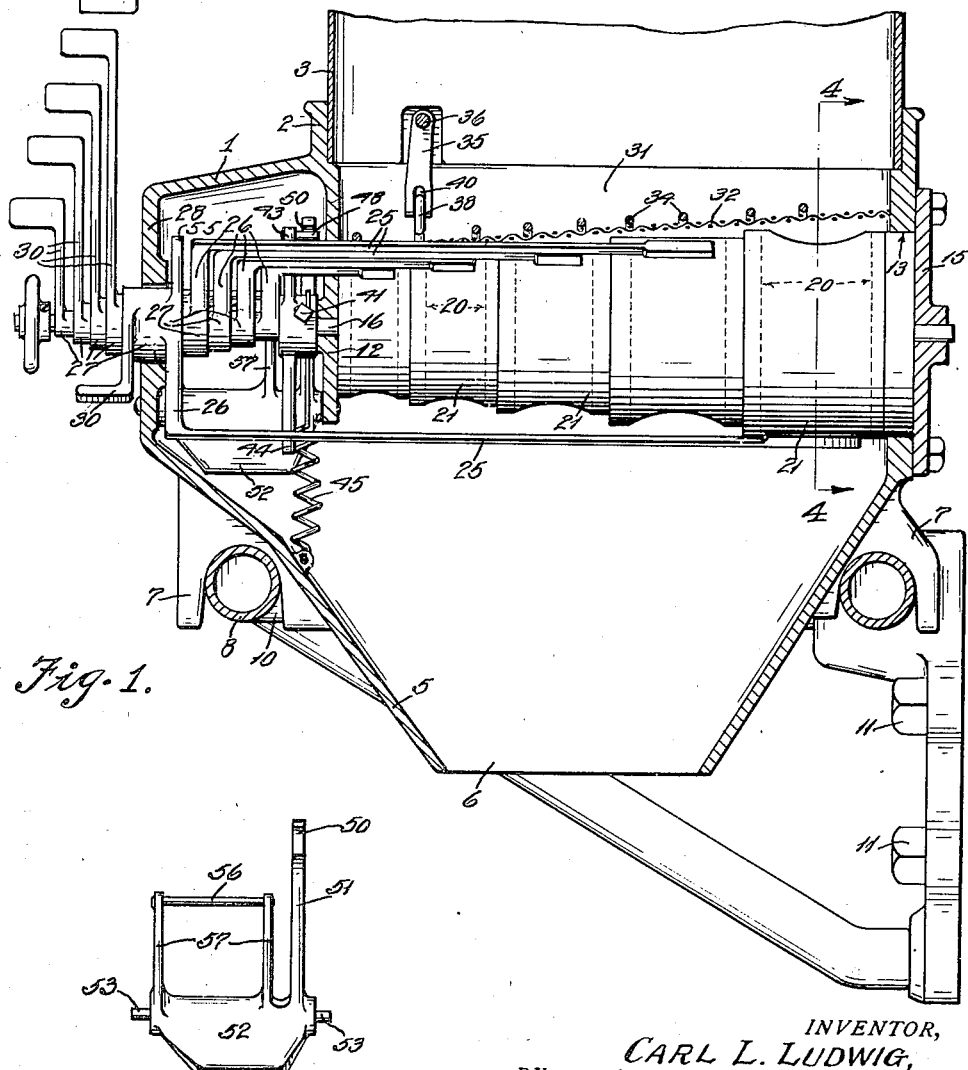
INVENTOR,
CARL L. LUDWIG,
BY Horace Barnes,
ATTORNEY.

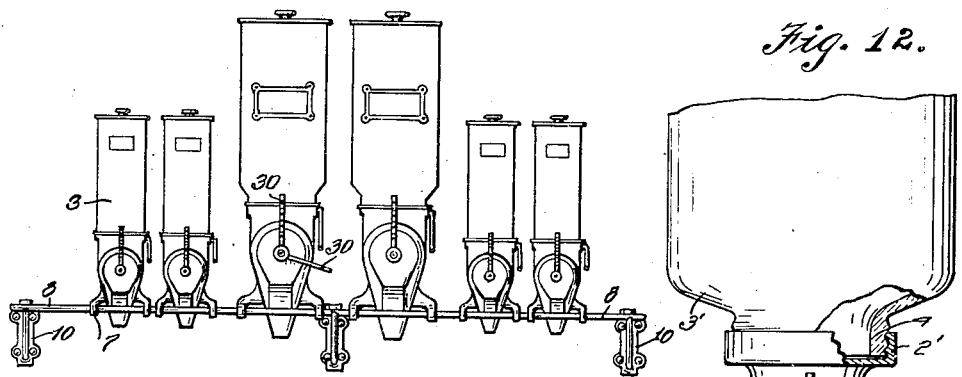
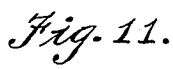
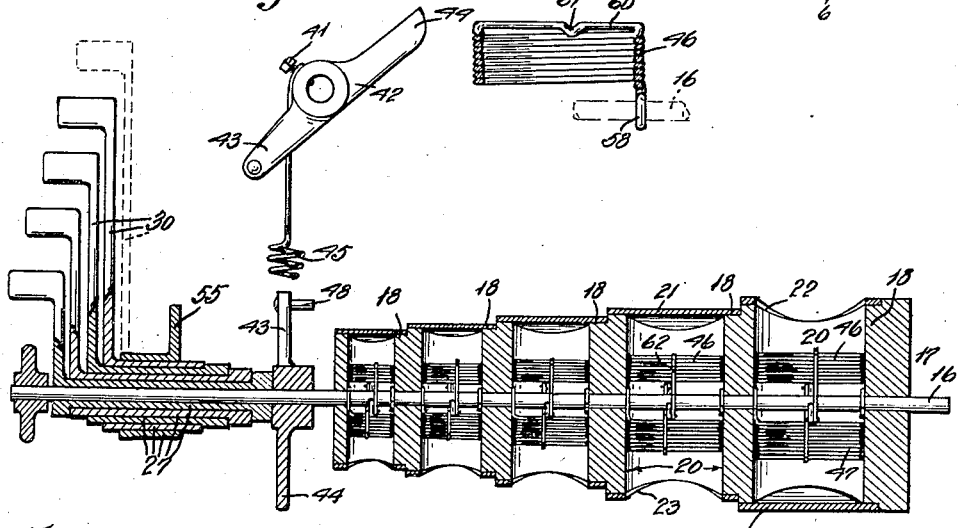

March 2, 1937.　　　C. L. LUDWIG　　　2,072,760
MEASURING AND DISPENSING APPLIANCE
Filed Sept. 14, 1936　　　4 Sheets-Sheet 3
Fig. 5.
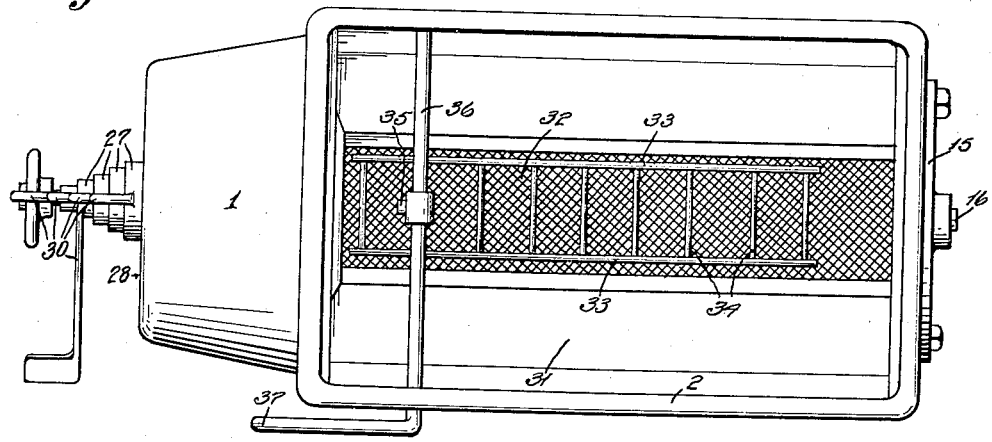
Fig. 6.
Fig. 7.
Fig. 10.
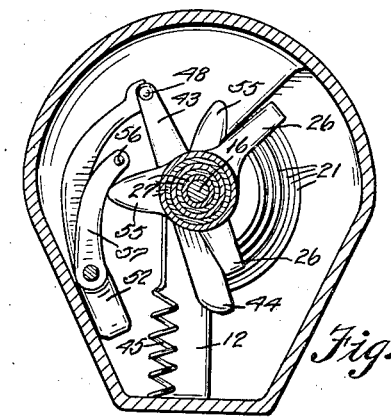
Fig. 4.
INVENTOR,
CARL L. LUDWIG,
BY Horace Barnes
ATTORNEY.

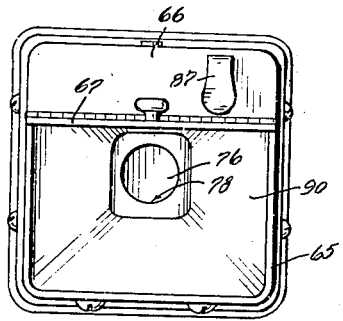
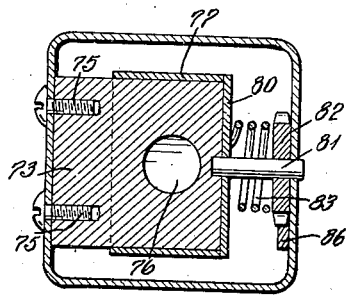
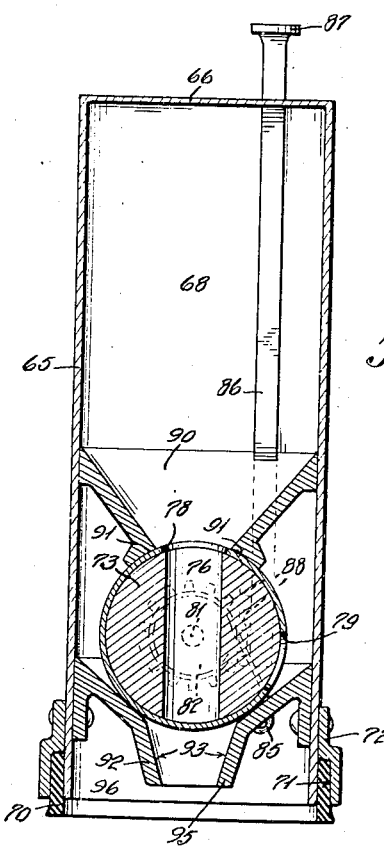
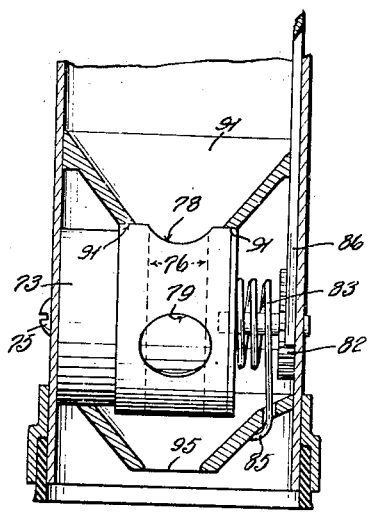

Patented Mar. 2, 1937

2,072,760

UNITED STATES PATENT OFFICE 2,072,760

MEASURING AND DISPENSING APPLIANCE

Carl L. Ludwig, Hermosa Beach, Calif.

Application September 14, 1936, Serial No. 100,670

17 Claims. (Cl. 221—106)

This invention relates to improvements in domestic culinary appliances, and particularly automatic measuring and dispensing devices.

The principal object of my invention is to provide practicable and relatively simple devices for measuring and delivering any granulated or powdered dry materials, such as flour, sugar, salt, etc., in any predetermined quantity as required and in the measurements specified in the ordinary kitchen recipe.

A further object of the invention is the provision of a common hopper for the storage of a quantity of such food ingredients and a common funnel for their delivery into a dish or other receptacle, together with intermediate metering units respectively formed cavities of graduated capacities comprising the usual measures and multiples thereof employed or most usually designated in kitchen recipes and which may be selectively filled and emptied through individual actuating devices convenient for manipulation and display at the front of the apparatus.

A still further object of my invention is to provide simple and convenient means for sifting the materials as they are fed into the metering cavities, together with resilient means for cleanly dislodging the materials from such cavities when the latter are opened for dumping.

A still further object of the invention is to provide substantially similar individual metering units mounted in separate housings for more portable use and adapted to dispense dry granulated materials, such as sugar, salt, and the like, for table use or as a kitchen appliance.

Other objects and advantages residing in my invention, and objects relating to details of construction and various arrangements of parts thereof, will be fully set forth in the detailed description to follow.

The accompanying drawings illustrate by way of example a representative form of my invention, in which:

Figure 1 is a view in vertical section through the casing of a measuring appliance embodying my invention.

Fig. 2 is a plan view of the operative measuring elements of the invention, detached from the casing.

Fig. 3 is a view in vertical section of the same.

Fig. 4 is a view in vertical section on line 4—4 of Fig. 1.

Fig. 5 is a plan view of the apparatus with the hopper removed.

Fig. 6 is a view in vertical section on line 6—6 of Fig. 1.

Fig. 7 is a view similar to Fig. 6 with the parts in different relation and without the housing.

Figs. 8 and 9 are detached views in side elevation of elements of the apparatus shown in Figs. 6 and 7.

Fig. 10 is a view in cross section of a metering unit showing the scouring-springs in expanded condition.

Fig. 11 is a detached view of one of said springs in contracted form.

Fig. 12 is a view in front elevation, partly broken away, of the invention shown with a modified form of hopper.

Fig. 13 is a view in front elevation of a plurality of appliances constituting my invention, illustrating a convenient means of mounting the same.

Fig. 14 is a view in vertical section of an embodiment of my invention comprising only a single measuring unit.

Fig. 15 is a top plan view of the same.

Fig. 16 is a partial view in vertical section taken on line 16—16 of Fig. 14.

Fig. 17 is a view in cross section on line 17—17 of Fig. 14.

Referring to said views, the reference numeral 1 indicates the exterior housing of my improved measuring appliance formed, preferably, of cast metal and including a flange 2 at its top for the reception of a hopper 3 in which dry, granular or powdered material, such as flour, sugar or salt may be retained. A slightly modified form of hopper is shown in Fig. 12 wherein the hopper 3' is in the form of a glass receptacle wherein the neck 4 is exteriorly screw-threaded and adapted to be screwed in inverted position within the circular, screw-threaded flange 2'.

The housing 1 may include integrally a funnel-shaped lower portion 5 having an outlet 6 desirably elevated at a sufficient height from a table or shelf, not shown, to admit of a cup or other kitchen vessel being placed therebelow to receive the measured materials. Said housing may be provided with legs, not shown, to stand upon a shelf or it may be screwed or otherwise secured to a wall in a convenient location, but preferably, I propose to provide the housing with a plurality of transversely aligned lugs 7 recessed to be received on tubular rods 8 mounted on brackets 10 secured to a wall by screws or bolts 11. Such mounting provides a secure support and affords space for the placing of a plurality of the measuring appliances each containing a different material, see Fig. 13, and permits of the number being readily added to from time to time.

The housing 1 is formed with an inner dependent partial wall 12 and a circular opening 13 at its rear closed by a bolted plate 15. The wall 12 and plate 15 are formed with aligned bearings for a rocking-shaft 16. Said shaft also has bearings axially of a meter-block 17 rigidly mounted between the wall 12 and plate 15 and removable through the opening 13. Said block is formed of a series of cylindrical sections 18 of progressively diminishing widths and diameters from its rear to the forward end of the block. Each said section is formed with a vertical, cylindrical bore 20 comprising a metering cavity, each said cavity being of progressively larger capacity from front to rear as determined by the diameter of the respective section and the diameter of the bore therein. Each said cavity is of predetermined capacity in accordance with the normal or usual scale of measurements employed for the specific material stored and measured therein, as cupfuls, tablespoonfuls, teaspoonfuls, or multiples or aliquot parts thereof.

Each said section is provided with an individual tubular sleeve 21 rotatable in a reasonably close fit thereon for a limited distance, and each said sleeve is formed with a pair of circular apertures 22 and 23 spaced to register, respectively, with the upper and lower ends of the respective metering cavity 20 at opposite ends of its travel, the opposite end of said cavity being closed by the sleeve meanwhile.

Each said sleeve is rigidly connected to a rod 25 extending longitudinally and are each connected by a radially directed arm 26 to an individual tubular shaft 27 rotatably mounted in concentric relation with other similar shafts on the rocking-shaft 16 and in the front wall 28 of the housing.

Exteriorly of the casing each of the tubular shafts 27 is connected to a radially directed lever 30 extending vertically and in longitudinal alignment, the metering cavities being closed by the sleeves at their upper ends with the levers 30 in their erect positions. By actuating the levers 30 individually or in combinations the sleeves 21 connected thereto are opened at their upper ends to receive the material from the hopper while the bottoms of said cavities are closed.

Below the hopper-receiving flange 2 the housing is formed integrally with partitions 31 upon either side sloping inwardly to meet the sleeves 21 rotatable between such partitions and the block 17. The material in the hopper is supported on said partitions and upon the respective sleeves when they are in closed positions, and immediately one or more sleeves are rotated to open a cavity, or a plurality of cavities, the material will drop into such cavities filling the same.

Some materials will require sifting before they are suitable for use and I have provided a sifting-screen 32 secured at its lateral sides to the partitions 31 while over and in contact with the screen I have provided an agitating device comprising longitudinal wire-members 33 rigidly connected together by cross-bars 34 and adapted to be reciprocated upon said screen longitudinally by an arm 35 connected for vibration on a shaft 36 journaled in the flange 2 and actuated by a lever-handle 37. Said screen is provided with a lug 38 received in a slot 40 of the arm 35. Upon the to and fro actuation of the lever 37 the agitating device will be moved back and forth on said screen to cause the material to sift therethrough into whichever cavities 20 are open.

The partial wall 12 provides an opening at one side thereof for the movements of the rods 25 in the actuation of the sleeves 21. Secured to the rocking-shaft 16 by a set-screw 41 is a dog 42, see Fig. 9, having oppositely disposed arms 43 and 44, the latter being of length to be engaged by any of the rods 25 and be carried with it in the partial rotation of the respective sleeve to similarly rotate the shaft 16 in opposition to a spring 45 connected to said dog and to compress a pair of springs 46 and 47 mounted in each of the cavities 20, to be hereinafter more fully described.

The arm 43 of said dog is provided with a laterally projecting pin 48 which, when the dog is wiped by the respective rod to a position which, when the opening 22 of the attached sleeve 21 is in register with the selected cavity, will lodge in a notch 50 of a latch-arm 51 integral with a latch-member 52 pivotally mounted upon trunnions 53 borne in the front wall 28 and wall 12. Each said tubular shaft 27 is formed or provided with a cam-lug 55 positioned with relation to the respective arm 26 to engage a bar 56 mounted in said latch-member on prongs 57 on the reverse movements of the rods 25, close to the latter end of said movements, to deflect the latch-member and swing the latch-arm 51 away from its engagement with the pin 48 and to release the shaft 16, which under the power exerted by the spring 45 and all of the springs 46 and 47 will snap back to its original position. Such tripping of the pin 48 will take place at or near the end of the return movement of the lever 31 and rod 25 when the opening 23 is in register with the lower end of the respective measuring cavity or cavities and the upper end thereof has been closed by the sleeve.

The springs 46 and 47 are designed to make it positive and certain that all of the material contained in measured quantities in the respective cavities 20 will be released and emptied therefrom upon the opening of the lower end of the cavity. They are desirably formed of spring-wire wound spirally to engage lightly the circular walls of the respective cavity and are positioned above and below the shaft 16 passing medially through all of said cavities. The inner ends of said springs may be engaged about said shaft, as seen at 58, while their outer ends are directed in a bar 60 extending diametrically across the terminal coil of the respective spring and is formed with a notch 61 at its middle portion. A link 62 is pivotally connected at one end to each said bar in the notch 61 and at its opposite end is similarly conected to an arm 63, said arm extending diametrically through the shaft 16 and is connected at its opposite ends to the respective links.

It will thus be seen that when the shaft 16 is actuated rotatively, either by hand through manipulation of the hand-wheel 64, or by the engagement of the rod 25 with the arm 44 of the dog 42 the arms 63 and links 62 will compress the springs 46 and 47, somewhat as shown in Fig. 4, and that upon the release of the rod said springs will assert themselves to expand to their open position, as indicated in Fig. 10, scouring the walls of the cavities and ensuring that all of the material in them will be dumped.

It is believed that the mode of operation of my improved measuring apparatus will be clearly understood from the foregoing description. It will be apparent that the size of the hoppers 31 will be commensurate with the bulk of the usual supply of the material kept on hand, and that the metering cavities 20 will be formed to provide measuring units conforming to the usages and directions ordinarily followed in kitchen recipes for the several materials. Said cavities may be employed in any number and suitable combination and the levers 30 will advantageously bear legends, not shown, indicating the measure of the respective cavity which it controls.

In Figs. 14 to 17 inclusive, I have shown my invention applied to an individual, unitary measuring device of similar construction in large part and adapted to contain and dispense in measured quantities dry materials, such as salt and sugar, regularly employed about a kitchen and used in customary quantities, such as a teaspoonful. Such device may also be utilized as a table convenience both in the home and in cafes and restaurants, being economical, cleanly and sanitary in use.

Said device consists of a casing 65 preferably of rectangular form having a top wall 66 including a hinged or other suitable lid 67 to provide access to the interior chamber 68 in which the material to be dispensed is contained. The bottom of said casing is open and may be provided with a rubber or other cushion strip 70 extending beyond the lower marginal edge of the casing, said strip being retained in a recess 71 of a retaining-band 72.

73 indicates a cylindrical block similar to the block 17 or one section 18 thereof, rigidly mounted upon a wall of the casing by screws 75. Said block is formed with a vertically directed cylindrical bore 76 extending therethrough providing a metering cavity. A cylindrical sleeve 77 is rotatably mounted on said block having circular apertures 78 and 79 spaced apart and adapted in size and position to register respectively with the top and bottom openings of said cavity in the alternate operative movements of the sleeve to fill and deliver the materials measured and dispensed thereby.

The sleeve 77 is formed with an end wall 80 keyed or otherwise rigidly connected to a shaft 81 rotatably mounted at its opposite ends axially of the block and in the side wall of the casing. A toothed pinion-wheel 82 is keyed on said shaft and a coil-spring 83 is mounted thereabout and connected at one end to the sleeve at a point spaced from its axis of rotation and at its other end is secured to a fixed part of the device, as at 85. 86 indicates a vertically disposed bar slidably mounted in the casing and extending from the top wall 66 where it terminates in a finger-engageable portion 87. The bar 86 is formed with ratchet-teeth 88 at its lower end co-acting with the gear-teeth of the pinion 82 to rotate the same when pressed inwardly to actuate the sleeve in opposition to the spring 83.

A funnel-shaped directing partition 90 is fixedly mounted within the chamber 68 whose lower lips 91 are in close relation with the exterior surface of the sleeve 77 and immediately about the aperture 78 when in register with the cavity 76 to direct the material into said cavity. Rigidly mounted below the block is a spout-member 92 having downwarly inclined surfaces 93 extending from the side walls of the casing into a spout 95 axially directed with respect to the cavity 76 and terminating somewhat within the lower end of the casing to provide a recess 96 therein to receive a cup or other small receptacle, not shown, in which the contents of the cavity may be deposited.

In the usual position of the sleeve as seen in said views the material may enter the cavity 76 through the aperture 78 to fill the same, the sleeve in the meantime closing the bottom of the cavity. The user places the casing over a receptacle and presses the bar 86 to actuate the bar downwardly and cause the ratchet-teeth thereon to actuate the pinion-wheel 82 and rotate the sleeve 77 in opposition to the spring 83 thus to close the upper end of the cavity and to open the lower end thereof through the registration of the aperture 79 therewith and allowing the material therein to escape through the spout 95. On the release of the bar the spring will rotate the sleeve back to its original position and the engagement of the pinion-wheel with the ratchet-teeth of the bar will also cause it to recede back to its elevated position, and bring the aperture 78 into alignment with the upper end of the cavity to admit of the cavity being again filled with the material from the chamber 68 thereabove.

Having thus described my invention, what I claim, is:

1. A measuring and dispensing appliance, comprising a rigidly mounted hopper having an outlet at its lower end, a fixed block formed with a measuring cavity extending vertically therethrough communicating with said hopper-outlet, and means to alternately open and close the opposite ends of said cavity to admit of the filling and dumping of a measured quantity of granular material therefrom, substantially as described.

2. A measuring and dispensing appliance, comprising a fixed block formed with a measuring cavity extending vertically therethrough, means to open the upper end of said cavity and close the lower end thereof simultaneously, and vice versa, whereby said cavity may be alternately filled and dumped of a measured quantity of granular material by its gravity, and means to expel said material from said cavity.

3. A measuring and dispensing appliance, comprising a rigidly mounted hopper having an outlet at its lower end, a fixed cylindrical block formed with a vertically disposed measuring cavity extending therethrough communicating with said hopper-outlet, a cylindrical sleeve mounted for partial rotation on said block having a pair of apertures arranged to alternately register with the opposite ends of said cavity and to simultaneously close the other end of said cavity, and means to actuate said sleeve.

4. A measuring and dispensing appliance, comprising a fixed housing including a hopper having an outlet at its lower end, a fixed block formed with a vertically disposed measuring cavity therethrough communicating with said hopper outlet, valve apparatus arranged to open the upper end of said cavity and close the lower end thereof, and vice versa, to alternately fill and dump granular material from said hopper by its gravity, and means to actuate said apparatus, substantially as described.

5. A measuring and dispensing appliance, comprising a fixed block formed of a plurality of cylindrical sections of various diameters, said sections each having a diametrically disposed vertical measuring cavity extending therethrough, and means to alternately fill and expel granular material from said cavities selectively.

6. A measuring and dispensing appliance, comprising a fixed block formed of a plurality of cylindrical sections of various diameters, said sections each having a vertically disposed measuring cavity extending therethrough, valve apparatus arranged to selectively open the upper ends of said cavities and close the lower ends thereof, and vice versa, to alternately fill and dump granular material therein by its gravity, means to actuate said valve apparatus, and means controlled by said actuating means to expel said material from said cavities.

7. A measuring and dispensing appliance, comprising a fixed block formed of a plurality of cylindrical sections of various diameters, each said section having a vertically disposed measuring cavity extending therethrough, a rotatable sleeve partially rotatable about each said section formed with spaced apertures arranged to alternately open and close the opposite ends of each said cavity at the termination of each of its rotary movements, and means to actuate said sleeves individually.

8. A measuring and dispensing appliance, comprising a fixed block formed of a plurality of cylindrical sections of various diameters, each said section having a vertically disposed measuring cavity extending therethrough, a rotatable sleeve partially rotatable about each said section formed with spaced apertures arranged to alternately open and close the opposite ends of each said cavity at the termination of its rotary movements, a rod connected to each said sleeve extending longitudinally of said block, an arm connected to each said rod, concentric tubular shafts connected to the respective arms, and a manually actuated lever connected to each said shaft.

9. A measuring and dispensing appliance, comprising the structure set forth in claim 8, and wherein the cylindrical sections of the block are arranged in progressively diminishing diameters forwardly from the rear of said block.

10. In a measuring and dispensing appliance, the combination with a block having a plurality of cylindrical measuring cavities extending vertically therethrough, means to alternately open and close the opposite ends of each said cavity to alternately admit therein and dump by gravity a measured quantity of granular material, and means to scrape the walls of each said cavity to expel the contents thereof at each dumping operation.

11. The structure as recited in claim 10, wherein the last named means comprises a spiral spring mounted in close relation to the walls of each said cavity, and a rod extending diametrically of each said cavity operatively connected to said spring to compress and release the same to scrape the walls and expel the material from each cavity.

12. A measuring and dispensing appliance, comprising a block having a cylindrical measuring cavity extending vertically therethrough, a spiral spring mounted in said cavity concentrically with the walls thereof, and means to compress and release said spring to dislodge material contained in said cavity, substantially as described.

13. A measuring and dispensing appliance, consisting in combination with a housing including a hopper to contain granular material, a block in said housing having a plurality of measuring cavities extending vertically therethrough, and means to open the upper ends of said cavities selectively and close the lower ends thereof, and vice versa, of a sifting screen extending over the upper end of each said cavity, and means to agitate the material above said screen.

14. A measuring and dispensing appliance, consisting of a housing, a hopper for granulated material upon said housing, a block rigidly mounted in said housing below said hopper, said block being formed of a plurality of cylindrical sections of various progressively diminishing diameters, each said section having a vertically disposed cylindrical cavity extending therethrough, a sleeve rotatably mounted about each said section formed with spaced apertures respectively registering with the opposite ends of the respective said cavity while closing the opposite end thereof, a rocking-shaft extending axially through said block and traversing medially each said cavity, means actuated by said shaft to dislodge the material in any said cavity, and means to actuate said sleeves individually to open and close said cavities.

15. A measuring and dispensing appliance, consisting of a housing a hopper for granulated material mounted upon said housing, a block rigidly mounted in said housing below said hopper, said block being formed of a plurality of cylindrical sections of various progressively diminishing diameters, each said section having a vertically disposed cylindrical cavity extending therethrough, a sleeve rotatably mounted about each said section formed with spaced apertures respectively registering with the opposite ends of the respective said cavity while closing the opposite end thereof, a rocking-shaft extending axially through said block and traversing medially each said cavity, means actuated by said shaft to dislodge the material in said cavities, a rod connected to each said sleeve, pivotally mounted crank-means including an individual lever externally of the housing to actuate each said rod to open and close the opposite ends of any of said cavities, and means to actuate said material dislodging means in the operative movements of said rods.

16. A measuring and dispensing appliance, comprising a rigidly mounted block having a vertically directed cavity therein to measure a quantity of granular material, a sleeve rotatably mounted on said block formed with a pair of spaced apertures registering with the opposite ends of said cavity respectively at opposite ends of its rotation and simultaneously closing the other end thereof, a rocking-shaft rotatively mounted axially of said block and traversing said cavity, spiral springs mounted in said cavity on opposite sides of said shaft, link connections between said shaft and said springs to compress the same, a rod connected to said sleeve, crank-means to actuate said rod and sleeve, means to engage said shaft in the initial movement of said rod to compress said springs, and means to release said springs to dislodge the material from said cavity in the reverse movements of said rod.

17. A measuring and dispensing appliance, consisting of a chambered casing to receive a granular material, a fixed cylindrical block in said casing, having a vertically disposed cavity extending therethrough, a sleeve rotatably mounted on said block having a pair of spaced apertures registering with the opposite ends of said cavity respectively at the opposite ends of its movement, a shaft rigidly connected to the sleeve in the axis of rotation thereof, a pinion-wheel keyed to said shaft, a vertically slidable bar provided with ratchet-teeth cooperating with said pinion-wheel to rotate said sleeve in one direction, a coil-spring connected to said sleeve to rotate the sleeve in the opposite direction, and a partition in the casing-chamber directing the material into said cavity.

CARL L. LUDWIG.